United States Patent [19]

Norita et al.

[11] Patent Number: 4,989,094

[45] Date of Patent: Jan. 29, 1991

[54] SOLID STATE IMAGE SENSOR DRIVE APPARATUS

[75] Inventors: Toshio Norita, Sakai; Tokuji Ishida, Daito; Masataka Hamada, Osaka; Toshihiko Karasaki, Sakai; Nobuyuki Taniguchi, Nishinomiya, all of Japan

[73] Assignee: Minolta Camera Kabushiki Kaisha, Osaka, Japan

[21] Appl. No.: 287,051

[22] Filed: Dec. 21, 1988

Related U.S. Application Data

[63] Continuation of Ser. No. 41,080, Apr. 21, 1987, Pat. No. 4,809,077.

[30] Foreign Application Priority Data

Apr. 22, 1986 [JP] Japan .................................. 61-93157

[51] Int. Cl.$^5$ .............................................. H04N 3/14
[52] U.S. Cl. .............................. 358/213.19; 358/213.29
[58] Field of Search ..................... 358/213.19, 213.26, 358/213.27, 213.29, 213.31, 228

[56] References Cited

U.S. PATENT DOCUMENTS

| | | | |
|---|---|---|---|
| 4,547,676 | 10/1985 | Suzuki et al. | 358/213.19 |
| 4,563,708 | 1/1986 | Ishibashi | 358/213.19 |
| 4,703,365 | 10/1987 | Mumford | 358/213.26 |
| 4,809,077 | 2/1989 | Norita et al. | 358/213.26 |

Primary Examiner—Stephen Brinich
Attorney, Agent, or Firm—Burns, Doane, Swecker & Mathis

[57] ABSTRACT

A solid state image sensor drive apparatus in accordance with the present invention enables a solid state image sensor to start integration of photoelectric current in response to an integration clear signal so that electric charges are accumulated to a prescribed level and transferred to a shift register. The accumulated electric charges transferred to the shift register are read out successively based on a transfer signal so that it is supplied to a microcomputer performing various operations. At this time, if a request for interruption is inputted from a load to the microcomputer, the transfer signal supplied to the shift register is stopped and the content of the shift register is not supplied to the microcomputer. When the interruption processing in the microcomputer is completed, the transfer signal is supplied again to the shift register so that transfer of data from the shift register to the microcomputer is restarted.

3 Claims, 6 Drawing Sheets

SOLID STATE IMAGE SENSOR DRIVE APPARATUS

This application is a continuation, of application Ser. No. 041,080, filed Apr. 21, 1987.

BACKGROUND OF THE INVENTION

1. Field of the Invention

The present invention relates to a solid state image sensor drive apparatus and particularly to a drive apparatus which controls the operation of a solid state image sensor such as a CCD in accordance with the brightness of an object to be imaged.

2. Description of the Prior Art

A focus detecting apparatus of a camera is known as an example of a control apparatus using a CCD. Such a focus detecting apparatus evaluates or calculates a focus condition or an in-focus position of an objective lens by analyzing an image signal read out from CCD based on an image of an object to be photographed formed on the CCD cell through the objective lens, so that the objective lens is brought into an in-focus position in accordance with the result of the analysis. In such a focus detecting apparatus, the position of the objective lens to be driven is fixedly determined, in response to an operation for the start of exposure operation, by definitely adopting the result of the analysis of the image signal provided immediately before the start of the exposure operation. However, prior to that stage, that is, when a shutter release button is pressed at a first stage, an in-focus position is repeatedly detected and the objective lens is successively moved to an in-focus position accompanied by movements of an object and the camera.

More specifically, reading of an image signal from the CCD and analysis of the image signal are repeated at high speed so that an in-focus position is evaluated according to movements of the object and the camera. A solid state image sensor such as a CCD receives a light image impinged on a photodiode array portion thereof and converts the amount of received light into an electric charge by individually integrating photoelectric current generated in each photodiode of the photodiode array so that the accumulated electric charge is read out as a voltage signal.

The above described focus detecting apparatus is arranged to output an image signal of a level enough for the focus detection by changing, in accordance with brightness of an object, a period of time for integrating photoelectric current of the CCD so as to ensure reliability of focus detecting operation. As a result, in the above described focus detecting apparatus, an integration stop signal for designating the termination of the integration or accumulation of the CCD is outputted non periodically and therefore it is asynchronous with respect to the control operation of a control device such as a microcomputer which controls various operations including image signal reading operation of the focus detecting apparatus. Consequently, the following problem is caused.

In the CCD, photoelectric current generated in each photodiode of the photodiode array is applied for the current integration or charge accumulation by means of a capacitor component of each photodiode and a voltage signal representing the accumulated charge as an image signal of each capacitor component is moved or shifted in parallel to a shift register by a shift pulse so that the content of the shift register is serially read out by transfer clock signals. Accordingly, the above described shift pulse is outputted with timing dependent on the brightness of an object. Since the shift pulse is outputted asynchronously with respect to the operation of the microcomputer, if the shift pulse is outputted while the microcomputer performs other control operation, the image signal is unavoidably transmitted successively from the CCD.

As a result, since the microcomputer can not store or read the image signal in a memory or a RAM thereof, the accumulation operation of the CCD is wasted. On the contrary, if the microcomputer is adapted to interrupt other processing operation to receive the image signal transmitted from the CCD when a shift pulse is outputted, a delay is caused in other control operation by the microcomputer although the operation of the CCD is not wasted, which makes it difficult for the apparatus to perform processing operation at high speed.

SUMMARY OF THE INVENTION

Therefore, a primary object of the present invention is to provide a solid state image sensor drive apparatus which reads or captures precisely electric charge accumulated in a solid state image sensor at high speed.

It is another object of the present invention to provide a solid state image sensor drive apparatus which is capable of interrupting reading of electric charge accumulated in a solid state image sensor while control means performs other control operation and is capable of restarting the reading of the electric charge at the end of the control operation.

Briefly stated, the present invention comprises a solid state image sensor including a plurality of light receiving elements, electric charge accumulation means and an analog shift register. The electric charges corresponding to the light impinged on the light receiving elements are accumulated in the charge accumulation means. When the accumulation is completed, the accumulated electric charges are transferred in parallel to the analog shift register and are read out successively therefrom based on transfer signal to a control means for processing various operations. The transmission of the transfer signal can be interrupted during the reading of the electric charges and restarted.

Consequently, according to the present invention, when the control means performs other operation, the transmission of the transfer signal is interrupted to stop the reading of the electric charges from the analog shift register, and when the control means finishes the operation concerned, the transmission of the transfer signal is restarted to read the electric charges from the analog shift register.

These objects and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
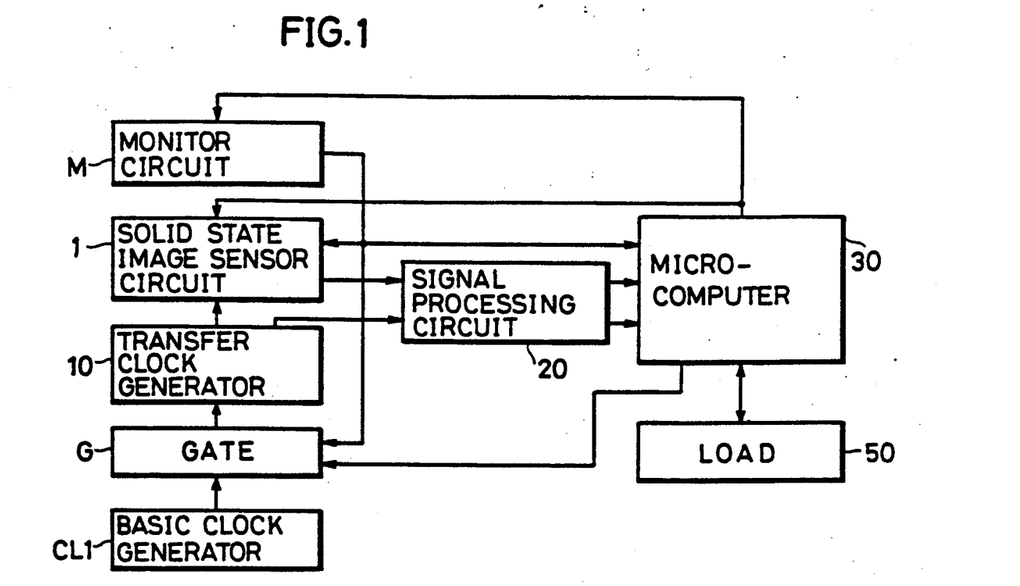
FIG. 1 is a schematic block diagram showing an outline of the present invention.

FIG. 1 is a schematic block diagram showing an outline of the present invention. A solid state image sensor drive apparatus of the embodiment shown in FIG. 1 comprises a solid state image sensor circuit I, a monitor circuit M, a transfer clock generator 10, a signal processing circuit 20, a gate circuit G, a basic clock generator CL1, a microcomputer 30 and a load 50. The solid state image sensor circuit I comprises a self-scanning type image sensor such as a CCD, and a shift register and the like. The monitor circuit M comprises a light receiving device for detecting brightness of an object to be focus adjusted. The microcomputer 30 controls the load 50. An integration clear signal is supplied from the microcomputer 30 to the solid state image sensor circuit I and the monitor circuit M. In response to this integration clear signal, the solid state image sensor circuit I starts integration of photoelectric current and the monitor circuit M starts monitor of the time of integration of the solid state image sensor circuit I. By this monitor operation, it is determined that the integration of the solid state image sensor circuit I should be terminated or stopped when an output of the light receiving device of the monitor circuit M, for example, attains a prescribed level.

After attainment of the prescribed level, the monitor circuit M outputs an integration stop signal. The integration stop signal is supplied to microcomputer 30, the solid state image sensor circuit I and the gate circuit G. When the solid state image circuit I receives the integration stop signal, a plurality of electric charges accumulated in the solid state image sensor are transferred as an image signal or a picture signal to the shift register.

The gate circuit G receives a transfer stop signal from the microcomputer 30 and also receives basic clock pulses from the basic clock generator CL1. When the transfer stop signal is not supplied from the microcomputer 30 to the gate circuit G, the gate circuit G is unblocked or opened by the integration stop signal from the monitor circuit M so that the basic clock pulses generated by the basic clock generator CL1 are supplied to a transfer clock generator 10. The transfer clock generator 10 supplies transfer clock pulses to the solid state image sensor circuit I based on the basic clock pulses. In response to the transfer clock pulses, the solid state image sensor circuit I successively outputs information stored in the shift register to the microcomputer 30 through a signal processing circuit 20. The microcomputer 30 counts the number of data contained in the information supplied from the solid state image sensor circuit I, thereby to determine what data numbered in the shift register is read or captured at present.

On the other hand, when the transfer stop signal for stopping the transfer clock pulses is supplied from the microcomputer 30 to the gate circuit G, the gate circuit G is blocked or closed even if the integration stop signal is outputted from the monitor circuit M, and it is closed even if data is transmitted successively from the shift register. It is noted that the microcomputer 30 outputs the transfer stop signal when it performs interruption processing upon an interruption request from the load 50.

In the solid state image sensor drive apparatus thus constructed, if the integration stop signal is outputted from the monitor circuit M during the interruption processing by the microcomputer 30, the accumulated charges are transferred to the shift register from the solid state image sensor in the solid state image sensor circuit I. At this time, the gate circuit G is closed and therefore the transfer clock pulses from the transfer clock generator 10 are not supplied to the solid state image sensor circuit I and, thus, data is not transmitted from the shift register.

At the same time, the integration stop signal is supplied to the microcomputer 30 and the microcomputer 30 sets a flag in response to the integration stop signal. After the interruption processing, the microcomputer 30 determines whether the flag is set or not. If the flag is set, the gate circuit G is opened to supply the transfer clock pulses to the image sensor and the microcomputer 30 starts reading of the data held in the shift register. If an interruption request is issued during the reading of the data from the shift register, the microcomputer 30 outputs, to the gate circuit G, the transfer stop signal for stopping the transfer clock pulses so that the gate circuit G is closed. After the interruption processing, the gate circuit G is opened to restart the reading of the data. At this time, the microcomputer 30 stops transmission of the transfer stop signal for stopping the transfer clock pulses so as to restart reading of data corresponding to the stopped picture elements of the photodiodes. Thus, if reading operation of information from the solid state image sensor circuit I is interrupted, no disturbance is caused in the image signal.

Figure 2:
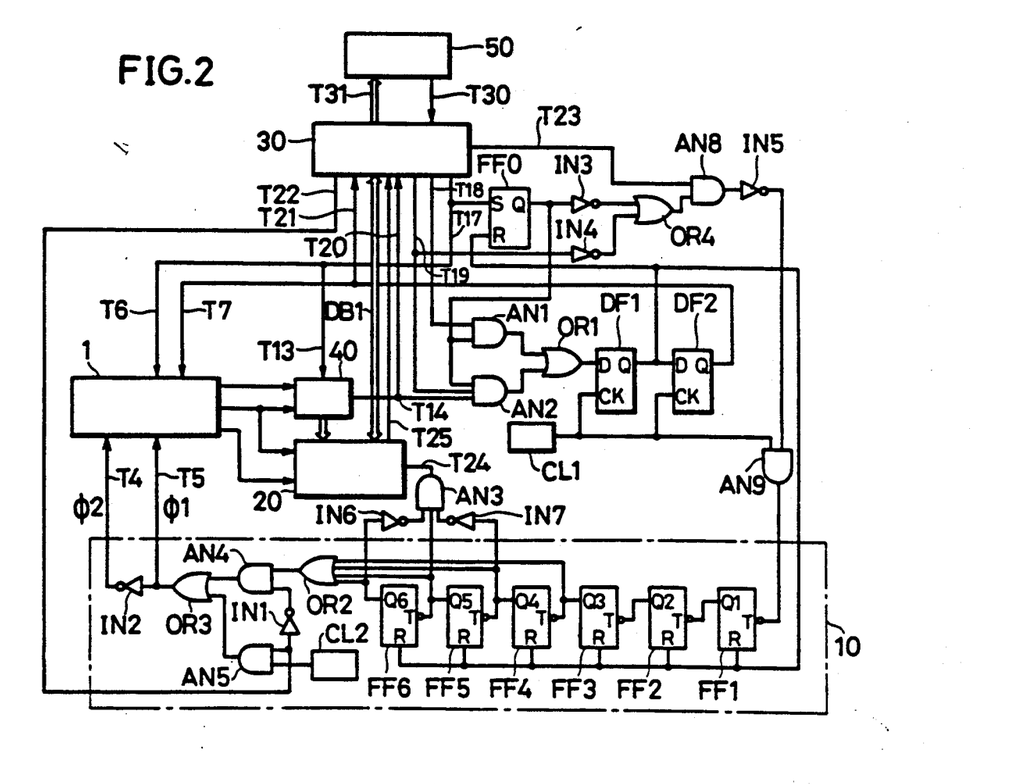
FIG. 2 is a block diagram of an embodiment in which the present invention is applied to an automatic focus detecting apparatus of a camera.

FIG. 2 is a block diagram of an embodiment in which the present invention is applied to an automatic focus detecting apparatus of a camera. First, the embodiment shown in FIG. 2 will be described. A photoelectric converting portion 1 corresponds to the solid state image sensor circuit I and part of the monitor circuit M shown in FIG. 1 and this photoelectric converting portion 1 comprises a self-scanning type linear image sensor such as a CCD, a picture signal output circuit, a light receiving device for use in the monitoring of the brightness of an object, a brightness monitoring circuit and a reference signal generating circuit. An analog-to-digital converting circuit 20 performs analog-to-digital convertion of a signal outputted successively from the photoelectric converting portion 1 by amplifying it suitably. A brightness determining circuit 40 corresponds to the monitor circuit M shown in FIG. 1 and controls the amplification factor of the analog-to-digital converting circuit 20 and the photoelectric current integration time of the self-scanning type image sensor. This brightness determining circuit 40 compares an integrated output of the monitoring light receiving device, supplied from the monitoring circuit in the photoelectric converting portion 1, with a reference level of the reference signal generating circuit in the photoelectric converting portion 1 and this circuit 40 outputs the result of the comparison.

The brightness monitoring circuit in the photoelectric converting portion 1 starts integration of an output of the monitoring light receiving device simultaneously with integration of the outputs of the photodiode array in the CCD and stops the integration when the integration output thereof coincides with the above stated reference level, so that integration outputs of the photodiode array of the CCD are transferred to the shift register. At this time, irrespective of the brightness of the object, the time of integration is limited within 100 m sec. and the brightness of the object is classified into groups so that a dynamic range of a picture signal is nearly equal, whereby the amplification factor of the analog-to-digital converting circuit 20 is changed according to the groups.

The transfer clock generator 10 as shown in FIG. 1 supplies transfer clock pulses to the solid state image sensor circuit I through the gate circuit G. More specifically, pulse signals $\phi 1$ and $\phi 2$ frequency-divided by a transfer clock generator 10 comprising T flip-flops FF1 to FF6 are supplied to the photoelectric converting portion 1 as the transfer clock pulses. The transfer clock pulses have two phases, namely, the pulse signal $\phi 1$ and the pulse signal $\phi 2$ obtained by inverting the pulse signal $\phi 1$. The load 50 connected to the microcomputer 30 is a driving circuit of a motor for moving an objective lens of a camera, for example, and the microcomputer 30 controls rotation of the motor based on data of a difference between a detected in-focus position to be focus adjusted and the present position of the objective lens. If the difference between the in-focus position and the present position of the objective lens is large, the rotation is made faster and if the difference is small, the rotation is made slower. When the objective lens approaches the in-focus position, control operation such as braking of the motor is performed.

The microcomputer 30 outputs an integration clear signal to a terminal T17 so that the integration clear signal is supplied to a terminal T6 of the photoelectric converting portion 1. Electric charge accumulated in the CCD is cleared by this integration clear signal and at the fall of the integration clear signal, integration of photoelectric current is started. As described above, when a signal representing that the integration output of the monitoring light receiving device reaches a reference level is outputted from the brightness determining circuit 40 to a terminal T14, this signal is supplied to an AND circuit AN2 and is also supplied to a terminal T20 of the microcomputer 30. The signal outputted from the brightness determining circuit 40 passes through the AND circuit AN2, an OR circuit OR1, and is supplied to D flip-flops DF1 and DF2 so that it is converted to a pulse signal of 2 $\mu$sec. having a delay of one pulse (2 $\mu$sec.) of the output pulses of the basic clock generator CL1 and this pulse signal is supplied to a terminal T7 of the photoelectric converting portion 1 as a shift pulse.

When the shift pulse is supplied to the terminal T7, the electric charge accumulated in the CCD is transferred to the shift register. A circuit portion comprising an AND circuit AN9, an inverter IN5, an AND circuit AN8, an OR circuit OR4, inverters IN3 and IN4, an R-S flip-flop FF0 etc. corresponds to the gate circuit G shown in FIG. 1.

When the above mentioned integration clear signal is inputted to a set terminal of the R-S flip-flop FF0, an output Q thereof rises to an "H(high)" level. Normally, a terminal T19 for outputting a shift pulse generation permitting signal of the microcomputer 30 is at the "H" level and since the output Q of the R-S flip-flop FF0 is also at the "H" level, the AND circuit AN2 is opened and the output of the brightness determining circuit 40 is supplied to the D flip-flops DF1 and DF2 passing through the AND circuit AN2 and the OR circuit OR1 and is converted to the shift pulse as described above. Since the R-S flip-flop FF0 is reset by the output Q of the D flip-flop DF1, the R-S flip-flop FF0 is reset 2 $\mu$sec. before the application of the shift pulse and the output Q thereof is at an "L(low)" level. The output Q of the "L" level is inverted by the inverter IN3 and the inverted output passes through the OR circuit OR4 so that a signal of the "H" level is supplied to the AND circuit AN8.

However, if a terminal T23 of the microcomputer 30 is at the "L" level, the output of the AND circuit AN8 is at the "L" level and, consequently, an output of the inverter IN5 rises to the "H" level so that the AND circuit AN9 is opened. Thus, the output pulses of the basic clock generator CL1 are supplied through the AND circuit AN9 to the transfer clock generator 10 comprising the T flip-flops FF1 to FF6 so that frequency-divided pulses are supplied to the photoelectric converting portion 1 as the transfer clock pulses $\phi 1$ and $\phi 2$.

When the microcomputer 30 starts interruption processing upon receipt of the interruption request, a signal of the "H" level is supplied to the terminal T23. In this case, if an output of the R-S flip-flop FF0 is at the "L" level or the microcomputer 30 outputs a signal of the "L" level from the terminal T19, an output of the AND circuit AN8 rises to the "H" level and an output of the inverter IN5 falls to the "L" level. As a result, the AND circuit AN9 is closed and the pulses of the basic clock generator CL1 are stopped from being supplied to the transfer clock generator 10.

At the terminals T4 and T5 of the photoelectric converting portion 1, transfer clock pulses supplied from the above mentioned transfer clock generator 10 or transfer clock pulses having a period shorter than that from the transfer clock generator 10 for initially resetting the CCD are selected to be inputted thereto as the transfer clock pulses $\phi 2$ and $\phi 1$. The short-period transfer clock pulses are outputted from a clock generator CL2 included in the transfer clock generator 10. Those transfer clock pulses are selected by AND circuits AN4 and AN5. More specifically, if the terminal T22 of the microcomputer 30 is at the "L" level, the AND circuit AN4 is opened and therefore in this case, an output of the transfer clock generator 10 comprising the T flip-flops FF1 to FF6 is supplied to the photoelectric converting portion 1 as the transfer clock pulses $\phi 1$ and $\phi 2$ so that data is transmitted. If the terminal T22 is caused to rise to the "H" level to initialize the CCD, the AND circuit AN5 is opened and short-period clock pulses from the clock generator CL2 are supplied to the photoelectric converting portion 1 so that shifting is performed at high speed in the shift register to output data held in the shift register.

The terminal T18 of the microcomputer 30 outputs a signal of the "H" level after the lapse of 100 m sec. after the fall of the integration clear signal. The reason for this is as follows. If an integration stop signal is not outputted from the brightness determining circuit 40 after the lapse of 100 m sec. from the start of integration of photoelectric current by the CCD in the photoelectric converting portion 1 because of a low brightness of the object, a shift pulse is generated by setting the D flip-flop DF1 through the OR circuit OR1, instead of an output of the brightness determining circuit 40. In other words, according to this embodiment, the time of integration of photoelectric current is set so that it may not exceed 100 m sec. at the maximum.

Operation of the thus constructed automatic focus detecting apparatus will be briefly described in the following. First, in a standard operation mode where interruption is not applied to the microcomputer 30, a CCD initialization signal is outputted from the microcomputer 30 to the terminal T22 so that short-period clock pulses outputted from the clock generator CL2 are supplied to the terminals T4 and T5 of the photoelectric converting portion 1. As a result, the shift register of the photoelectric converting portion I is initialized. Then, an integration clear signal is outputted from the microcomputer 30 to the terminal T17 to clear the CCD of the photoelectric converting portion 1, whereby integration of photoelectric current is started.

When the time of integration dependent on the brightness of the object passed, an integration stop signal is outputted from the brightness determining circuit 40 to the terminal T14. This signal passes through the AND circuit AN2 and the OR circuit OR1 and is converted to a pulse signal by the D flip-flops DF1 and DF2 so that a shift pulse is supplied to the terminal 7 of the photoelectric converting portion 1. As a result, photoelectric current integration data of the CCD are transferred to the shift register.

Normally, the terminal T19 of the microcomputer 30 is at the "H" level and when the shift pulse is generated, an output of the R-S flip-flop FF0 falls to the "L" level and an output of the AND circuit AN8 which is caused to correspond to the output of the terminal T23 of the microcomputer 30 falls to the "L" level. This "L" level signal is inverted to an "H" level signal by the inverter IN5 so that the AND circuit AN9 is opened. As a result, output pulses of the basic clock generator CL1 are inputted through the AND circuit AN9 to the transfer clock generator 10 comprising the T flip-flops FF1 to FF6. Since the transfer clock pulses φ1 and φ2 are supplied from the transfer clock generator 10 to the photoelectric converting portion 1, when the shift pulse is supplied to the terminal T7 of the photoelectric converting portion 1, the shift register of the photoelectric converting portion 1 starts to transmit data held therein and the thus transmitted data is converted to digital data by the analog-to-digital converting circuit 20 so that the digital data is supplied to the microcomputer 30.

The microcomputer 30 counts a number of supplied data each time a data transmitted from the shift register is received. Thus, the microcomputer 30 determines what number the data just received has. After all of the data have been received, the microcomputer 30 outputs an initialization signal to the terminal T22 and then outputs an integration clear pulse to the terminal T17, whereby the operation routine returns to the initial state and the above described operation is repeated.

When an interruption request from the load 50 is issued to the microcomputer 30, the microcomputer 30 outputs an "H" level signal to the terminal T23 to perform interruption processing. In this state, after an integration stop signal has been outputted from the brightness determining circuit 40, the output Q of the R-S flip-flop FF0 falls to the "L" level and the output of the inverter IN3 rises to the "H" level. Accordingly, the output of the AND circuit AN8 rises to the "H" level, which is inverted to the "L" level by the inverter IN5. As a result, the AND circuit AN9 is closed and the transfer clock pulses are not supplied to the photoelectric converting portion 1.

When the interruption processing is completed, the output of the terminal T23 falls to the "L" level and the AND circuit AN 9 is opened so that transfer clock pulses are supplied to the photoelectric converting portion 1. Consequently, if an interruption is allowed during the transmission of data from the shift register, the transmission of data is interrupted and after the completion of the interruption processing, transmission of data is restarted. In this period, if the sequential numbers of the received data are stored in the microcomputer 30, no disturbance is caused in the order of data.

If an integration stop signal is outputted from the brightness determining circuit 40 during the interruption processing in the microcomputer 30, a shift pulse is supplied to the photoelectric converting portion 1 through the D flip-flops DF1 and DF2. As a result, the photoelectric current integration data is transferred to the shift register. However, since the supply of the transfer clock pulses is inhibited as described above, the data in the shift register is maintained therein and is not outputted and after the completion of the interruption processing, transmission of the data is restarted.

Now, detailed construction and operation of the respective portions of the above described embodiment will be specifically described. A shift pulse forming circuit comprises the AND circuits AN1 and AN2, the OR circuit OR1 and the D flip-flops DF1 and DF2. The AND circuits AN1 and AN2 and the OR circuit OR1 output a shift pulse in response to the integration stop signal from the brightness determining circuit 40 or in response to the signal outputted from the terminal T18 of the microcomputer 30 after the lapse of 100 m sec. from the accumulation start. More specifically, when an integration clear signal is outputted to the terminal T17, the R-S flip-flop FF0 is set and an output Q thereof is supplied to the AND circuits AN1 and AN2. Since the signal at the terminal T19 is normally at the "H" level, the integration stop signal from the brightness determining circuit 40 is supplied to the D flip-flop DF1. The D flip-flop DF1 reads an input at a terminal D at the rise of the subsequent output pulse of the basic clock generator CL1, whereby the output Q rises to the "H" level. Since the R-S flip-flop FF0 is reset by the output Q of the D flip-flop DF1, the input of the D flip-flop DF1 falls to the "L" level.

In response to the subsequent clock pulse, the D flip-flop DF2 reads the output Q of the D flip-flop DF1 so that the output Q of the D flip-flop DF2 rises to the "H" level. On the other hand, the output Q of the D flip-flop DF1 falls to the "L" level and in response to the further subsequent clock pulse, the output Q of the D flip-flop DF2 falls to the "L" level. The output Q of the D flip-flop DF2 serves as the shift pulse and since a period of a clock is 2 μsec., the shift pulse becomes a pulse signal having a width of 2 μsec. delayed by 2 sec. after the end of the accumulation.

The R-S flip-flop FF0 is arranged to output a pulse signal in response to either signal outputted earlier, i.e. either the integration stop signal outputted from the brightness determining circuit 40 or a signal outputted at the terminal T18 of the microcomputer 30 after the lapse of 100 m sec. The R-S flip-flop FF0 is set by the integration clear signal outputted at the terminal T17 to open the AND circuits AN1 and AN2 and is reset when the output Q of the D flip-flop DF1 rises to the "H" level in response to either signal outputted earlier from the terminal T17 or the brightness determining circuit 40 to close the AND circuits AN1 and AN2, whereby output of the shift pulse being generated twice by the signal outputted later is inhibited.

Now, the transfer clock generator 10 will be described. The transfer clock generator 10 comprises the T flip-flops FF1 to FF6. Normally, since the AND circuit AN9 is opened, basic clocks of the basic clock generator CL1 are inputted through the AND circuit AN9, to the T flip-flops FF1 to FF6 and divided into clocks of low frequency. The above described shift pulse is outputted independent of the phase of the frequency dividing operation. Thus, the T flip-flops FF1 to FF6 are reset by the output Q of the D flip-flop DF1 so that frequency dividing operation is restarted by a clock pulse having timing coincident with that of the shift pulse.

Figure 3:
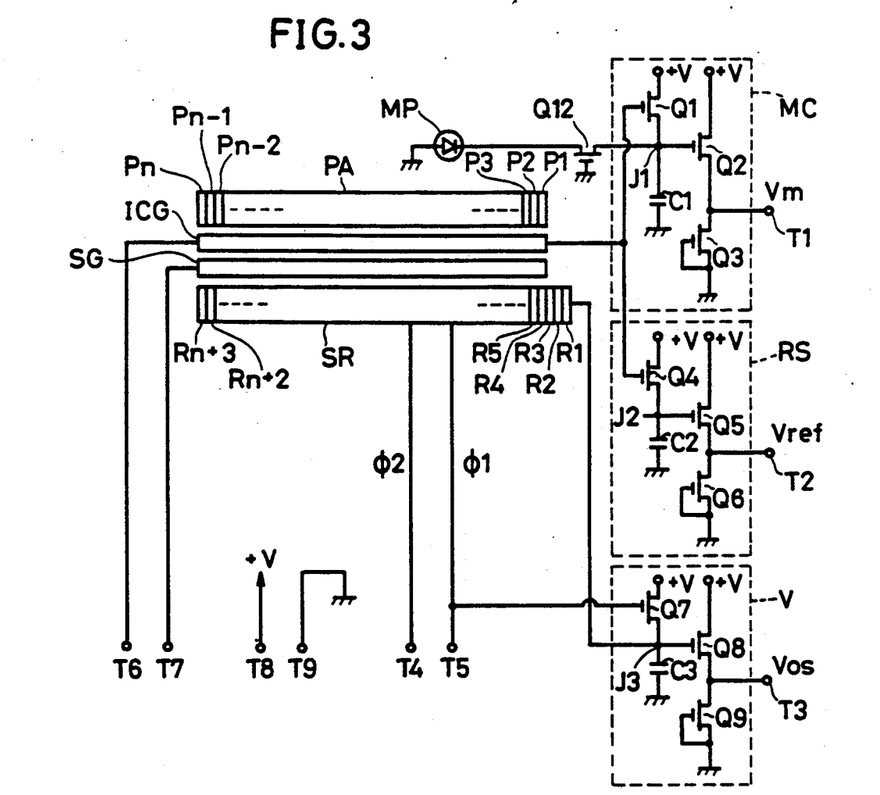
FIG. 3 is an electric circuit diagram showing a concrete configuration of a photoelectric converting portion shown in FIG. 2.
Figure 4:
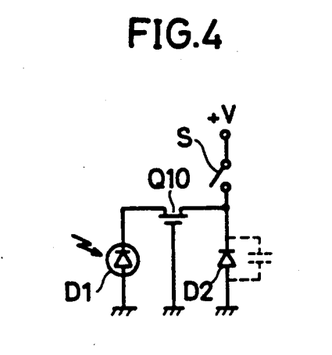
FIG. 4 is an equivalent circuit diagram for explaining a function of the CCD shown in FIG. 3.

FIG. 3 is an electric circuit diagram showing a concrete configuration of the photoelectric converting portion 1 shown in FIG. 2 and FIG. 4 is an equivalent circuit diagram for explaining the function of the CCD shown in FIG. 3.

Referring to FIGS. 3 and 4, the photoelectric converting portion 1 will be described. A self-scanning type image sensor comprises a linear image sensor PA formed by a row of photodiodes P1, P2, P3 ... Pn−2, Pn−1, and Pn, an integration clear gate ICG, a shift gate SG and a CCD shift register SR. The number of cells in the CCD shift register SR serving as a transfer portion is larger by three than the number of photodiodes (the number of picture elements) of the image sensor array PA serving as an electric charge storage portion and the cells R1, R2 and R3 are cells for empty or idle transfer. Electric charges stored in the photodiodes P1, P2, P3 ... Pn−2, Pn-1 and Pn of the linear image sensor PA are transferred to the cells R4, R5, R6 ... Rn+1, Rn+2 and Rn+3.

Each photodiode comprises a pair of diodes D1 and D2 connected in parallel to each other through a FET Q10 and a switch S corresponding to the integration clear gate ICG and provided for the supply of power from power source +V, as shown in FIG. 4 and the diode D1 is adapted to receive light. The FET Q10 is provided for the purpose of maintaining almost constant the voltage at both ends of the diode D1 to make it possible to disregard a capacity component of the diode D1, and a gate of the FET Q10 is grounded.

When the switch S is closed, electric charge is stored between the anode and the cathode of the diode D2 and the cathode voltage becomes almost equal to the power supply voltage. Then, when the switch S is opened, the diode D2 is discharged through the FET Q10 by the photoelectric current generated from the diode D1 and the cathode voltage is gradually lowered as the time passes. More specifically, it can be considered that negative electric charge is accumulated in the cathode of the diode D2 at a speed dependent on the intensity of light incident on the diode D1. Therefore, the following explanation will be given assuming that each photodiode accumulates electric charge at a speed dependent on the intensity of light incident thereon.

Practically, the switch S1 is formed by a semiconductor analog switch which is conducted by the integration clear signal inputted to the integration clear gate ICG and is cut off when the integration clear signal disappears. The shift gate SG transfers in parallel, upon receipt of the above described shift pulse, the electric charges integrated in the photodiodes P1, P2, P3 ... Pn−2, Pn−1 and Pn to the cells R4, R5, R6 ... Rn+1, Rn+2 and Rn+3 of the CCD shift register SR. Accumulation of electric charges in the photodiodes P1, P2, P3 ... Pn−2, Pn−1 and Pn is terminated when the shift pulse is inputted to the shift gate SG.

The CCD shift register SR outputs the stored electric charge for one cell successively to a picture signal output circuit to be described afterwards in response to the fall of the transfer clock pulse $\phi 1$ each time the transfer clock pulses $\phi 1$ and $\phi 2$ are inputted to the CCD shift register SR. A prescribed number of, ten for example, photodiodes P1, P2 ... P10 counted from one end of the linear image sensor PA are covered with an aluminum film and those photodiodes are used for correction of dark current component in the picture signal as described afterwards. Power source is applied to power supply terminals T8 and T9 shown in FIG. 3 so that it is supplied to a brightness monitoring circuit MC, a reference voltage generating circuit RS and a picture signal output circuit VS to be described afterwards.

The brightness monitoring circuit MC comprises FET's Q1, Q2 and Q3 and a capacitor C1. The FET Q1 is connected to an integration clear gate ICG of the image sensor and is conducted by the integration clear signal passing through the integration clear gate ICG so that the capacitor C1 is charged upto the level of the power supply voltage (+V). A node J1 between the FET Q1 and the capacitor C1 is connected to an anode of the photodiode MP through the FET Q12 and is also connected to the gate of the FET Q2. The FET Q12 is provided with a gate grounded so that the voltage at both ends of the photodiode MP may be maintained almost constant and that influence by the capacity component of the photodiode MP can be disregarded. The FET's Q2 and Q3 are connected in series to the power supply, whereby a buffer having a low output impedance and a high input impedance is formed. Since the FET Q3 is used in a source follower, a voltage (Vm) corresponding to a potential at the node J1 is outputted from an output terminal T1 extending from a node of the FET's Q2 and Q3. When the above described integration clear signal disappears, the FET Q1 is cut off and the capacitor C1 is discharged by the photoelectric current of the photodiode MP, whereby the output voltage at the terminal T1 is gradually decreased.

Figure 5:
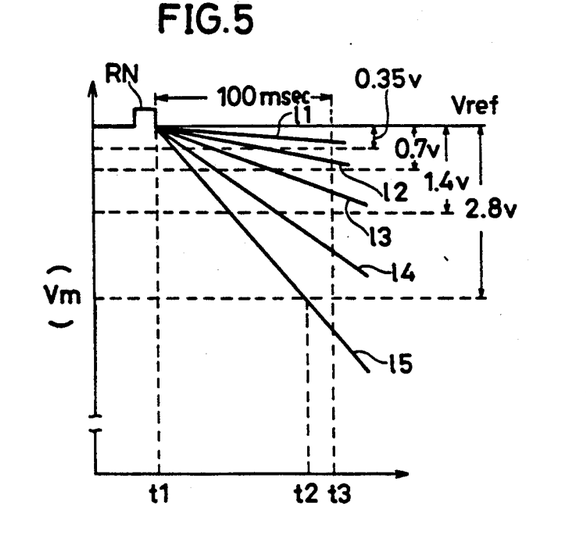
FIG. 5 is a diagram showing changes in output voltage of the terminal T1 shown in FIG. 3.

FIG. 5 shows changes in the output voltage at the terminal T1 shown in FIG. 3. In FIG. 5, lines l1 to l5 indicate that the speed of lowering the voltage changes dependent on the brightness. The waveform RN represents an induction noise due to the integration clear signal.

Referring again to FIG. 3, the reference voltage generating circuit RS comprises FET's Q4, Q5 and Q6, and a capacitor C2. Those components have the same characteristics as those of the above described FET's Q1, Q2, Q3 and the capacitor C1 and the circuit is connected in the same manner as in the FET's Q1, Q2, Q3 and the capacitor C1 in the brightness monitoring circuit MC. It is to be noted, however, that the gate of the FET Q5 is only connected to a node J2 between the FET Q4 and the capacitor C2. Accordingly, a voltage signal outputted from an output terminal T2 connected to a node of the FET's Q5 and Q6 is maintained constant as shown in FIG. 5 even after disappearance of the integration clear signal.

More specifically, the potentials at the nodes J1 and J2 immediately after the disappearance of the integration clear signal (at the time t1) are equal to each other because the characteristics of the FET's Q1, Q2, Q3 and the capacitor C1 and the characteristics of the FET's Q4, Q5, Q6 and the capacitor C2 are equal respectively, as described above. Consequently, the voltage signal outputted from the terminal T2 can be used as a reference voltage Vref for obtaining a drop amount of the voltage signal outputted from the terminal T1.

The picture signal output circuit VS comprises FET's Q7, Q8 and Q9, and a capacitor C3. Preferably, those components have the same characteristics as those of the FET's Q1, Q2, Q3 and the capacitor C1, respectively. The circuit VS is connected so that the transfer clock pulse $\phi 1$ is supplied to the gate of the FET Q7. A node J3 between the FET Q7 and the capacitor C3 is connected to the gate of the FET Q8 and to a transfer terminal of the shift register SR of the image sensor. Thus, while a transfer clock pulse $\phi 1$ is inputted, the FET Q7 is conducted and the capacitor C3 is charged upto the level of the power supply voltage (+V), whereby the picture signal output circuit VS is reset. The capacitor C3 is discharged repeatedly according to the stored electric charge in the CCD shift register SR, by the transfer clock pulse $\phi 2$. The FET's Q8 and Q9 form a buffer having a low output impedance and a high input impedance. An output corresponding to the accumulated electric charge in each photodiode as the picture element of the image sensor is successively outputted as a voltage signal Vos from an output terminal T3 extending to a node of the FET's Q8 and Q9 and those outputs form as a whole a picture signal.

Although the capacitors C1, C2 and C3 are used in the brightness monitoring circuit MC, the reference signal generating circuit RS and the picture signal output circuit VS, respectively, the configuration is not limited thereto and PN junctions of diodes may be used instead. In order to integrate those circuits, diodes are used as the capacitors C1, C2 and C3. The photodiode MP serving as the monitoring light receiving device is disposed in the vicinity of the linear image sensor PA so as to receive part of light passing through the objective lens.

Figure 6:
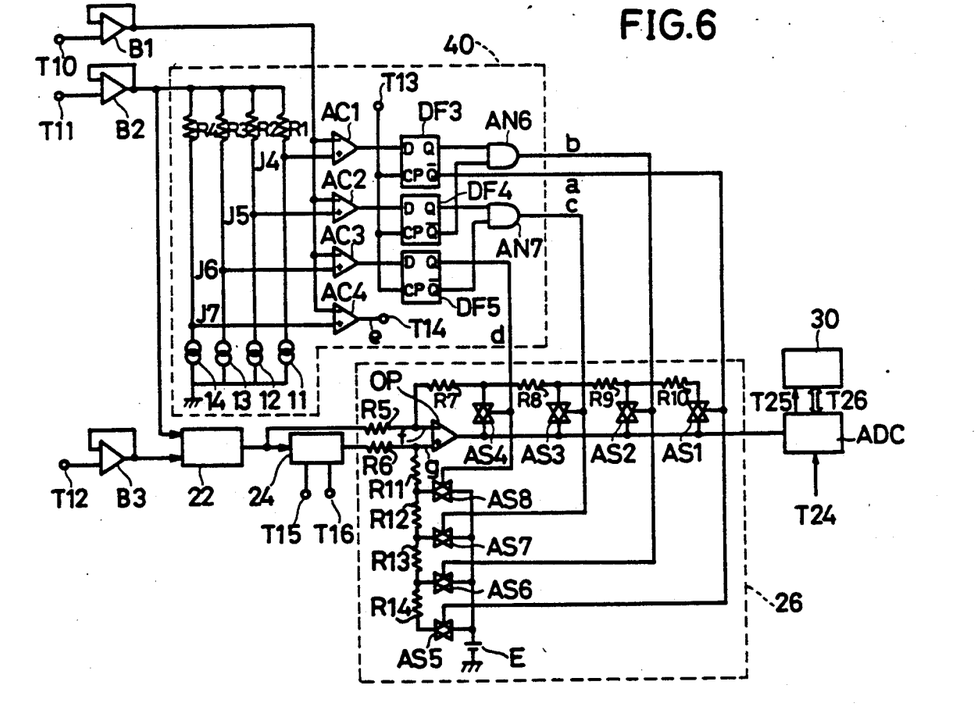
FIG. 6 is an electric circuit diagram of a brightness determining circuit and an analog-to-digital converting circuit shown in FIG. 2.

FIG. 6 is an electric circuit diagram showing, by way of example, the brightness determining circuit 40 and the analog-to-digital converting circuit 20 shown in FIG. 2. Referring to FIG. 6, terminals T10, T11 and T12 are connected to the terminals T1, T2 and T3 shown in FIG. 2 and terminals T13, T15 and T16 receive a latch pulse, a sample designation pulse and a sample designation reset pulse, respectively, through a data bus DB1 from the microcomputer 30. A terminal T14 is connected to one input terminal of the AND circuit AN2 shown in FIG. 2.

First, the brightness determining circuit 40 will be described referring to FIG. 6. The brightness determining circuit 40 comprises comparators AC1, AC2, AC3 and AC4 for determining, by steps, drop degrees of the output voltage (Vm) of the above described brightness monitoring circuit MC after the disappearance of the integration clear signal. Invertion input terminals of those comparators AC1 to AC4 are connected to the terminal T10 through a buffer B1. Non-invertion input terminals of the comparators AC1 to AC4 are connected to a node J4 of a resistor R1 and a constant current source I1, a node J5 of a resistor R2 and a constant current source I2, a node J6 of a resistor R3 and a constant current source I3, and a node J7 of a resistor R4 and a constant current source I4, respectively. The resistors R1 to R4 are connected to the terminal T11 through the buffer B2.

By thus connecting the circuit, voltages obtained by subtracting, from the voltage (Vref) of the reference voltage generating circuit RS supplied at the terminal T11, voltage drop values due to the resistors R1, R2, R3 and R4 are generated at the nodes J4, J5, J6 and J7, respectively. If resistance values of the resistors R1, R2, R3 and R4 and current values of the constant current sources I1, I2, I3 and I4 are selected suitably, outputs of the comparators AC1, AC2, AC3 and AC4 successively change from the "L" level to the "H" level according to the voltage drop degrees of the output voltage (Vm) of the brightness monitoring circuit MC inputted to the terminal T10.

The D flip-flops DF3, DF4 and DF5 have D input terminals connected to the outputs of the comparators AC1, AC2 and AC3, respectively. Clock pulse input terminals thereof receive the shift pulse as a latch pulse from the terminal T13 and those D flip-flops are latched at the termination of accumulation. When the latch pulse is inputted, the D flip-flops DF3, DF4 and DF5 store and generate from the outputs Q thereof results of the comparison which have been outputted from the comparators AC1, AC2 and AC3. One of the input terminals of the AND circuit AN6 receives the output Q of the D flip-flop DF3 and the other input terminal thereof receive the output $\overline{Q}$ of the D flip-flop DF4. One of the input terminals of the AND circuit AN7 receives the output Q of the D flip-flop DF4 and the other input terminal thereof receives the output $\overline{Q}$ of the D flip-flop DF5. Terminals b and c of the outputs of the AND circuits AN6 and AN7, a terminal a of the output $\overline{Q}$ of the D flip-flop DF3, a terminal d of the output Q of the D flip-flop DF5 and a terminal e of the output of the comparator AC4 serve as outputs of the brightness determining circuit 40. In other words, those outputs are signals indicating brightness levels detected by the monitoring light receiving device MP.

This will be explained in more detail referring to FIG. 5. In FIG. 5, the characteristic lines l1, l2, l3 and l4 represent changes in the output voltage of the brightness monitoring circuit MC in the cases of voltage drop occurring within the above described predetermined time 100 m sec. i.e., from the time t1 of disappearance of the integration clear signal to the time t3, being in the ranges of less than 0.35V, from 0.35V to 0.7V, from 0.7V to 1.4V, and from 1.4V to 2.8V, respectively. The characteristic line l5 represents a change in the output voltage of the brightness monitoring circuit MC with a voltage drop of 2.8V in a period shorter than the prescribed time 100 m sec. i.e., from the time t1 of disappearance of the integration clear signal to the time t2 shown in FIG. 5. Decreasing speed of the voltage drops shown by the characteristic lines l1 to l5 occurs depends on the magnitude of the photoelectric current produced from the monitoring light receiving device PM as described above. The cases of the lines l1 to l4 as the changes in the output voltage of the brightness monitoring circuit MC correspond to cases when the brightness of the image is relatively low and the case of the line l5 corresponds to a case when the brightness of the image is relatively high.

Now, assuming that the resistance values of the resistors R1 to R4 and the current values of the constant current sources I1 to I4 are selected so that voltages at the terminals J4 to J7 are lower than the output voltage Vref of the reference voltage generating circuit RS inputted to the terminal T11 by 0.35V, 0.7V, 1.4V and 2.8V, respectively, the outputs Q and $\overline{Q}$ of the D flip-flops DF3, DF4 and DF5 and the terminals a, b, c, d and e of the brightness monitoring circuit MC corresponding to the lines l1 to l5 after generation of the latch pulse are as shown in the following Table I.

TABLE I

|    | DF3 | | DF4 | | DF5 | | | | |
|----|-----|-----|-----|-----|-----|-----|---|---|---|
|    | Q | $\overline{Q}$(a) | Q | $\overline{Q}$ | Q(d) | $\overline{Q}$ | b | c | e |
| l1 | 0 | 1 | 0 | 1 | 0 | 1 | 0 | 0 | 0 |
| l2 | 1 | 0 | 0 | 1 | 0 | 1 | 1 | 0 | 0 |
| l3 | 1 | 0 | 1 | 0 | 0 | 1 | 0 | 1 | 0 |
| l4 | 1 | 0 | 1 | 0 | 1 | 0 | 0 | 0 | 0 |
| l5 | 1 | 0 | 1 | 0 | 1 | 0 | 0 | 0 | 1 |

In the case of the line l5, the output signal e of the comparator AC4 changes from the "L" level to the "H" level in a period from the time t1 of disappearance of the integration clear signal to the time t2 before the lapse of the prescribed time 100 m sec.

Referring to FIG. 6, in addition to the brightness determining circuit 40, there are further provided a subtracting circuit 22, a peak value detecting circuit 24, an amplifier 26 and an analog-to-digital converter ADC, by which the analog-to-digital converting circuit 20 is formed. The subtracting circuit 22 generates an output voltage V1 corresponding to a difference between an output voltage Vos of the picture signal output circuit VS inputted from the terminal T12 through the buffer B3 and an output voltage Vref of the reference signal generating circuit RS inputted from the terminal T11 through the buffer B2. The peak value detecting circuit 24 detects and holds a peak value V2 (a picture signal of the lowest level) of the picture signal corresponding to the electric charges on the photodiodes P2 to P9, which are eight diodes out of the ten diodes P1 to P10, covered with the aluminum film in the image sensor array PA, with the diodes P1 and P10 at both ends being excluded. This peak value detecting circuit 24 forms the signal V2 for so-called dark output correction with respect to the picture signal corresponding to the electric charge accumulated in the photodiodes, not covered with an aluminum film, in the linear image sensor PA for receiving the image of an object.

More specifically, if the stored electric charges are successively transferred to the picture signal output circuit VS from the CCD shift register SR in response to the transfer clock pulses $\phi 1$ and $\phi 2$, the microcomputer 30 supplies a sample designation pulse to the terminal T15 through the data bus DB1 simultaneously with the start of the transfer of the electric charge stored in the cell R5. Then, at the end of the transfer of the electric charge stored in the cell R12, the microcomputer 30 outputs a sample designation reset pulse to the terminal T16 through the data bus DB1. Accordingly, the peak value detecting circuit 24 receives the electric charges stored in the cells R5 to R12, namely, a picture signal corresponding to the electric charges stored in the diodes P2 to P9 and detects and holds a peak value of received signals.

The amplifier 26 amplifies differentially the output signals V1 and V2 of the subtracting circuit 22 and the peak value detecting circuit 24. The amplifier 26 is adapted so that an amplification factor thereof is controlled by the output signals a, b, c and d of the brightness determining circuit 40. More specifically, the amplifier 26 comprises an operational amplifier OP, and input terminals f and g of this operational amplifier OP are connected to the subtracting circuit 22 and the peak value detecting circuit 24 through input resistors R5 and R6, respectively. Resistors R7 to R14 are provided to set the amplification factor of the operational amplifier OP. Assuming that a resistance value of each of the resistors R5, R6, R7, R8, R11 and R12 is r, a resistance value of each of the resistors R9 and R13 is 2r and a resistance value of each of the resistors R10 and R14 is 4r.

Analog switches AS1 to AS4 out of the analog switches AS1 to AS8 are provided to set a feedback resistance value of the operational amplifier OP by selectively connecting the resistors R7 to R10 in response to the output signals a to d. On the other hand, the analog switches AS5 to AS8 are provided to set a bias resistance value of the operational amplifier OP by selectively connecting the resistors R11 to R14 in response to the output signals a to d. More specifically, if the voltages drops represented by the lines l1 to l5 occur, the states of those analog switches and the resistors selected are shown in the following Table II.

TABLE II

|    | AS1 | AS2 | AS3 | AS4 | AS5 | AS6 | AS7 | AS8 |
|----|-----|-----|-----|-----|-----|-----|-----|-----|
| l1 | ON  | OFF | OFF | OFF | ON  | OFF | OFF | OFF |
| l2 | OFF | ON  | OFF | OFF | OFF | ON  | OFF | OFF |
| l3 | OFF | OFF | ON  | OFF | OFF | OFF | ON  | OFF |
| l4 | OFF | OFF | OFF | ON  | OFF | OFF | OFF | ON  |
| l5 | OFF | OFF | OFF | ON  | OFF | OFF | OFF | ON  |

|    | Resistors selected | A |
|----|--------------------|---|
| l1 | (R7) to (R10), (R11) to (R14) | 8 |
| l2 | (R7) to (R9), (R11) to (R13) | 4 |
| l3 | (R7)(R8)(R11), (R12) | 2 |
| l4 | (R7)(R11) | 1 |
| l5 | (R7)(R11) | 1 |

In Table II, A is the amplification factor of the operational amplifier OP and the output voltage Vout of the operational amplifier is represented as follows:

$$Vout = E + (V2 - V1) \times A$$

This output voltage Vout is supplied to the analog-to-digital converter ADC. In the above formula, E is a voltage of a constant voltage source E, which is suitably set according to an input level of the analog-to-digital converter ADC. An output signal of the analog-to-digital converter ADC corresponding to each picture signal is supplied through the data bus DB1 to the microcomputer 30 shown in FIG. 2 so that a focus condition of the objective lens is detected by digital operation based on a prescribed program.

Referring again to FIG. 2, operation for supplying digital data converted from analog data to the microcomputer 30 will be described. An output of the image sensor is transferred in synchronism with the transfer clock pulse $\phi 1$ at the fall thereof. Then, analog-to-digital convertion is started at the fall of an A/D start signal outputted to the terminal T24 with a delay of prescribed time after the transfer clock pulse $\phi 1$, formed by using the outputs of the T flip-flops FF1 to FF6 for providing transfer clock generation timing. In response thereto, the analog-to-digital converting circuit 20 resets the A/D signal of 8 bits and changes an analog-to-digital convertion end signal T25 to the "L" level. The delay time is set by taking account of the output of the image sensor and the delay time in the amplifier and the like at the subsequent stage.

The analog-to-digital converting circuit 20 starts the analog-to-digital convertion with the above described timing and when the analog-to-digital convertion is completed, and when the output of the image sensor is supplied to data bus DB1 as a digital signal of 8 bits, the convertion end signal T25 is brought to the "H" level. The microcomputer 30 determines whether the convertion end signal T25 is at the "L" level or at the "H" level. Then, it counts the number when the convertion end signal T25 is at the "H" level after output of the shift pulse from the completion of the accumulation of the CCD, whereby it determines what number the picture element outputted at that time corresponds to. Then, with the timing of the "H" level of the convertion end signal T25, the microcomputer 30 reads the A/D signal of 8 bits through the data bus DB1 so that picture intensity information of the CCD is obtained. Thus, the operation is repeated.

Figure 7:
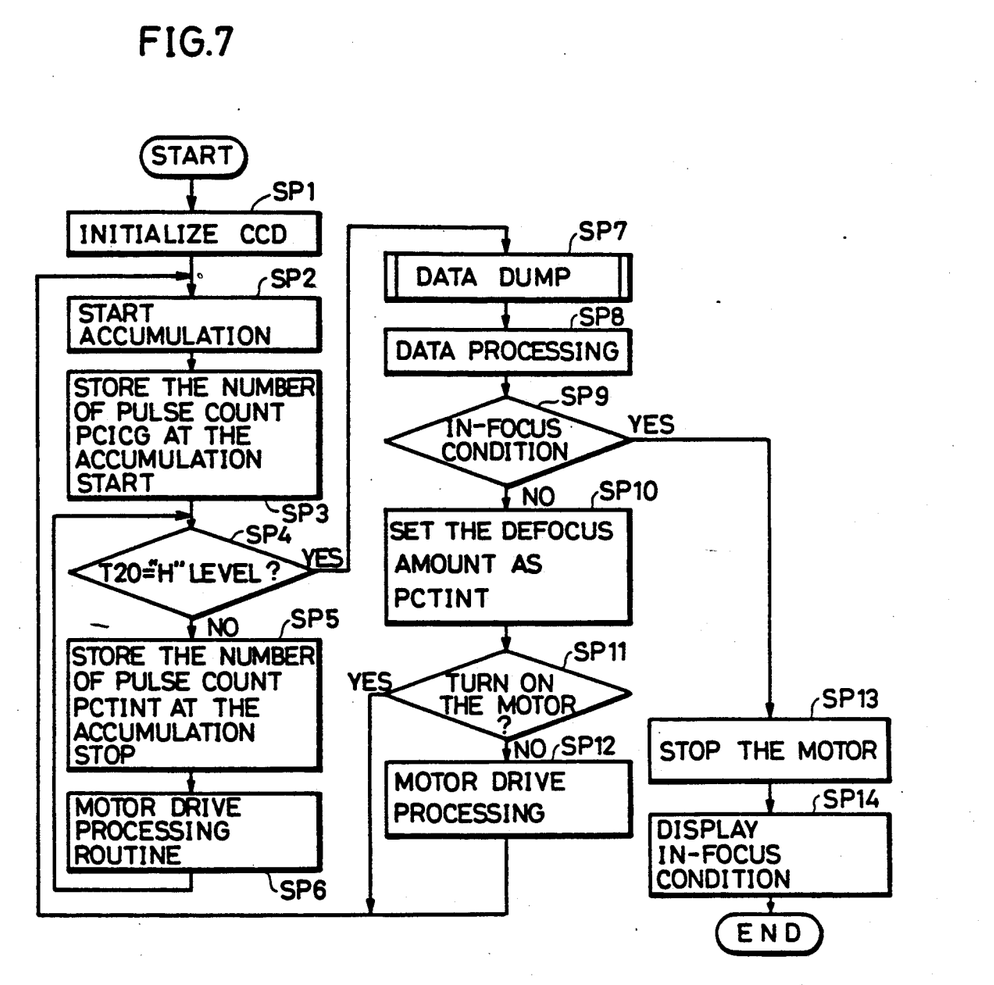
FIGS. 7, 8A and 8B are flow charts for specifically explaining operation of an embodiment of the present invention.
Figure 8A:
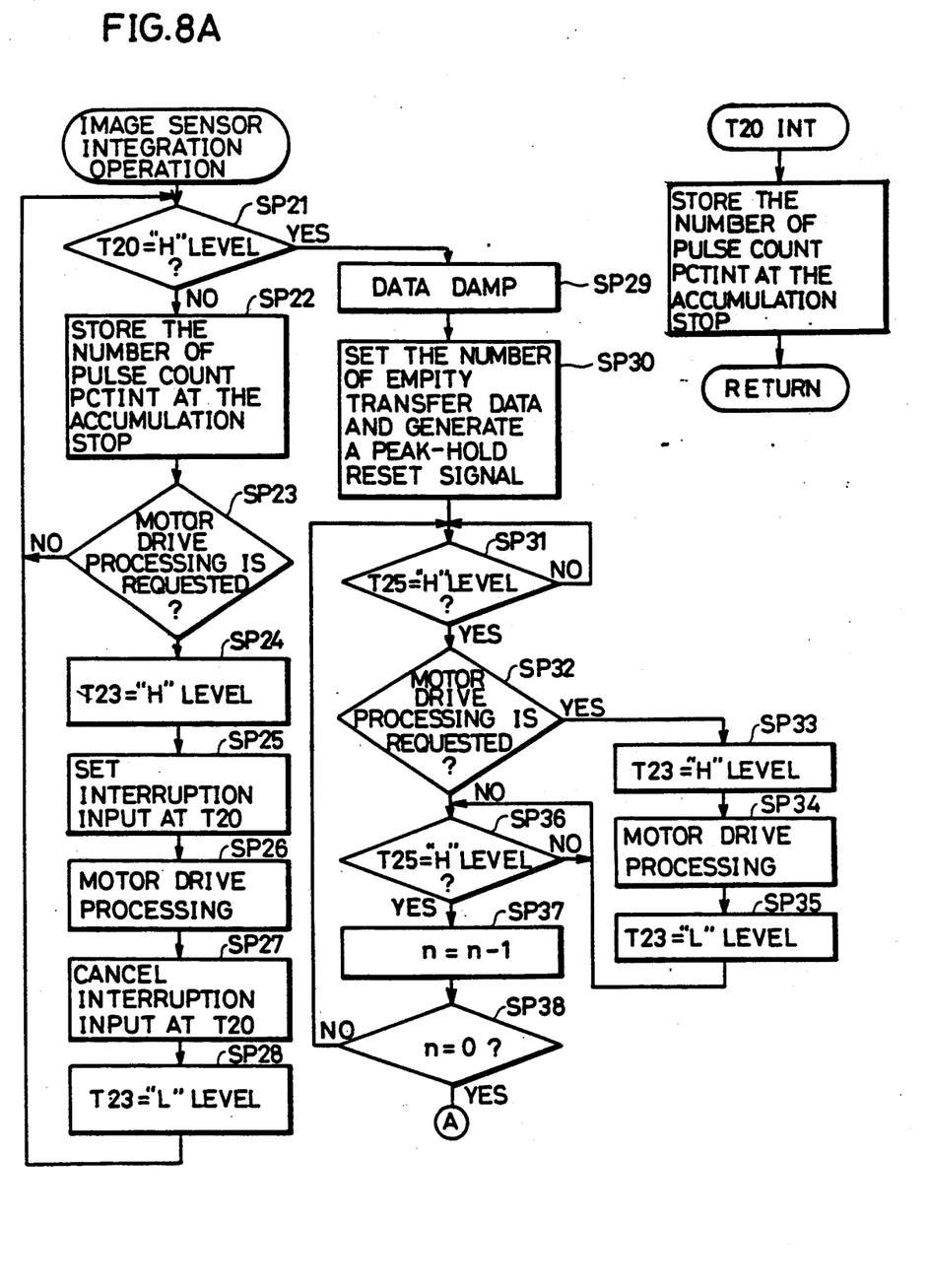
Figure 8B:
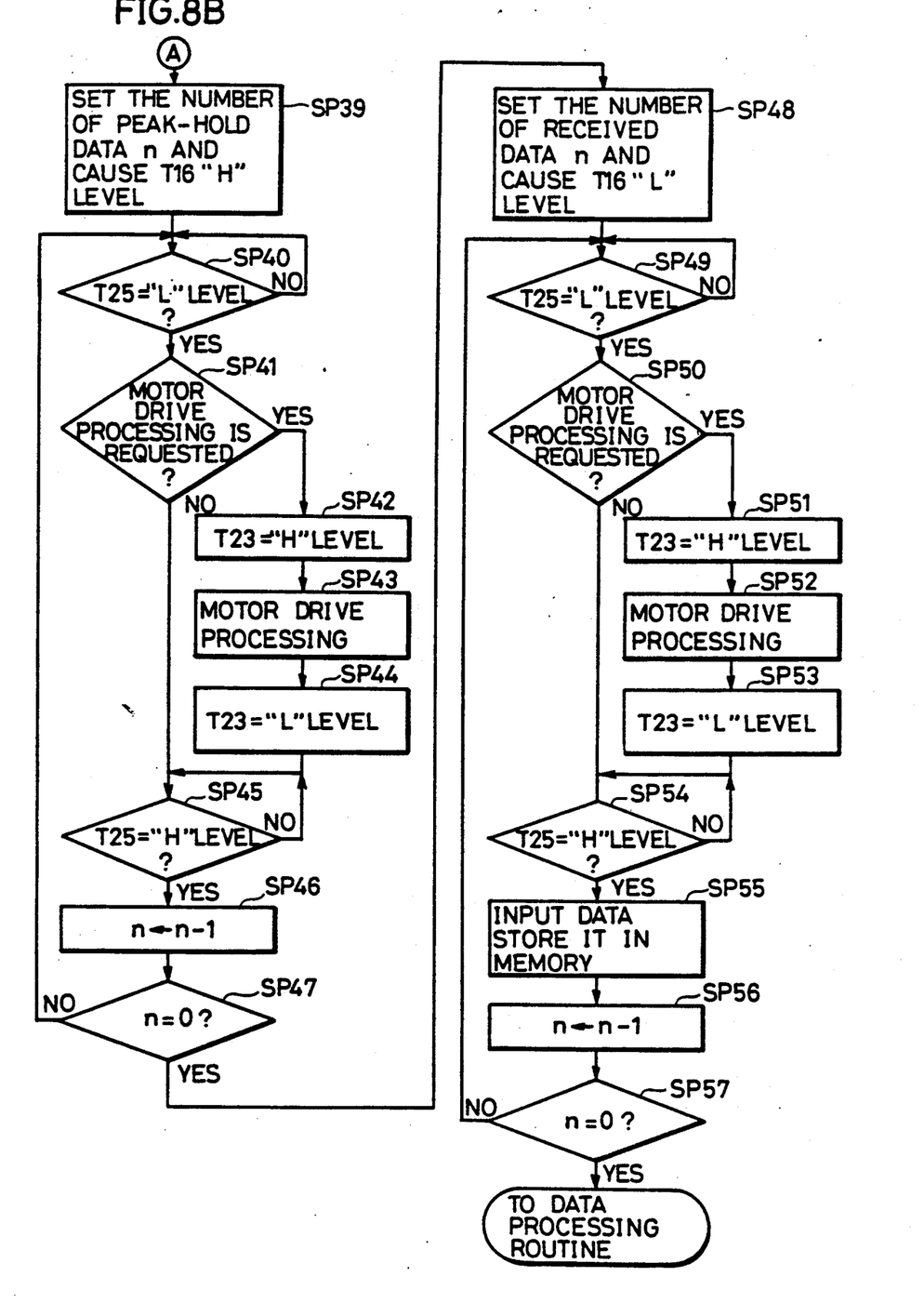

FIGS. 7, 8A and 8B are flow charts for specifically explaining operation of an embodiment of the present invention as an example of an automatic focus adjusting device for use in a camera.

In this embodiment, the load 50 includes a motor drive circuit which drives a motor for moving an object lens of the camera in accordance with the amount of defocus calculated in the microcomputer 30. The load 50 further includes a motor encoder for monitoring the rotation of the motor and generating pulse signals, the number thereof representing the amount of movement of the lens. The microcomputer 30 controls the motor drive circuit such that the driving of the motor is stopped when the count number of pulses from the motor encoder coincides with a desirable number of pulses corresponding to the calculated defocus amount. However, the objective lens can not be brought into an in-focus position when the charge accumulation and the focus calculation in the microcomputer 30 are carried out while the objective lens is being driven by the motor. It occurs due to the difference between the lens position at the start of the charge accumulation and that at the end of defocus calculation. To prevent this disadvantage, the microcomputer 30 includes a counter for counting the pulse signal from the motor encoder and corrects the defocus amount from the counted numbers by the counter at the start of the charge accumulation and the end of the charge accumulation.

Referring to FIGS. 7, 8A and 8B, operation of this embodiment will be specifically described. The microcomputer 30 at first outputs an "H" level CCD initialization signal to the terminal T22 in the step SP1 shown in FIG. 7 to open the AND circuit AN5. As a result, the short-period transfer clock pulses $\phi 1$ and $\phi 2$ are supplied to the photoelectric converting portion 1 from the clock generator CL2 through the AND circuit AN5, the OR circuit OR3 and the inverter IN2, so that the CCD is initialized. In the step SP2, the microcomputer 30 outputs an integration clear signal from the terminal T17. In response to the disappearance of the integration clear signal, integration of photoelectric current is started, whereby accumulation is started. In the step SP3, the microcomputer 30 stores in a RAM T1 the number of pulse count PCICG at the accumulation. In the step SP4, the microcomputer 30 determines whether the integration stop signal input to the terminal T20 attains the "H" level or not. If the integration stop signal attains the "H" level designation stop of the accumulation, the microcomputer 30 stores in a RAM T2, in the step SP5, the number of pulse count PCINT at the stop of accumulation. Then, the program goes to a motor drive processing routine in the step SP6.

More detailed procedures in the steps SP4 to SP6 are shown in the steps SP21 to SP28 in FIG. 8A. Referring to FIG. 8A, more detailed operation will be described. If the microcomputer 30 determines in the step SP21 the stop of accumulation, it stores, in the step SP22, the number of pulse count at the start of accumulation. Then, in the step SP23, the microcomputer 30 determines whether an interruption request for motor drive processing is issued or not. If the request for motor drive processing is not issued, the procedures in the steps SP21 to SP23 are repeated. In other words, the microcomputer 30 repeatedly stores the number of pulse count at the start of accumulation.

If it is determined in the step SP23 that the request for motor drive processing is issued, the microcomputer 30 outputs, in the step SP24, a transfer stop signal of the "H" level at the terminal T23. When the transfer stop signal of the "H" level is outputted, the transfer clock pulses $\phi 1$ and $\phi 2$ are not outputted from the transfer clock generator 10 and reading of data from the photoelectric converting portion 1 is stopped. In the step SP25, the microcomputer 30 sets an interruption input to the terminal T20. In this T20 interruption, the microcomputer 30, detecting the stop of accumulation, stores in a RAM T2 the number of pulse count PCTINT at the stop of accumulation necessary for correction of a lens moving amount. After that, the microcomputer 30 returns to the step SP26 to perform motor drive processing.

If a level obtained by integrating the photoelectric current from the photoelectric converting portion 1 attains a prescribed level during the motor drive processing, a state in which the picture signal is transferred in parallel to the CCD shift register SR is maintained. This is because output of the transfer clock pulses $\phi 1$ and $\phi 2$ from the frequency dividing circuit 10 is stopped by the transfer stop signal at the "H" level.

When the microcomputer 30 completes the motor drive processing in the step SP26, the microcomputer 30 cancels the interruption input by the integration stop signal in the step SP27. Then, in the step SP28, the microcomputer 30 causes the transfer stop signal outputted to the terminal T23 to fall to the "L" level so that the stop of the transfer clock pulses is cancelled. Then, the microcomputer 30 returns again to the step SP21 to determine whether the charge accumulation is completed or not.

If it is determined in the step SP4 in FIG. 7 or in the step SP21 in FIG. 8A that the integration stop signal attains the "H" level, the program proceeds to a data dump mode in the step SP7. The data dump mode includes the steps SP29 to SP57 as shown in FIGS. 8A and 8B. The data dump mode is divided into three groups. The first group consists of the steps SP30 to SP38, in which only the processing for counting the number of data corresponding to the outputs of empty transfer cells in the shift register SR is performed since the output thereof is not required for the processing. The second group consists of the steps SP39 to SP47, in which for the purpose of sampling and holding dark output, a peak-hold signal or a sample designation signal supplied to the terminal T16 is caused to be at the "H" level and the number of data corresponding to the dark component outputs of aluminum-covered photodiodes is counted by sampling the dark output in the peak-hold circuit 24. By the sampling and holding of the dark output, analog processing can be performed based on the data successively outputted subsequently, whereby only an actual light component can be extracted. The third mode consists of the steps SP48 to SP57, in which the result of analog-to-digital convertion of the actual light component of the photoelectric converting portion 1 is stored in memory through a 8-bit data bus DB1 in response to an analog-to-digital convertion end signal inputted to the terminal T25.

The microcomputer 30 sets a number n of empty cells in the shift register SR in the step SP30. Thus, since the number of cells of the CCD shift register SR is larger by three than the number of photodiodes of the linear image sensor PA, the electric charges stored in those three surplus cells are transmitted in an empty manner. At the same time, the microcomputer 30 sets, at the "L" level, a peak-hold reset signal or a sample designation reset signal supplied to the terminal T15 of the peak-hold circuit 24 so that the sampling state in the peak-hold circuit 24 is set.

Then, in the step SP31, the microcomputer 30 determines whether the analog-to-digital convertion end signal supplied to the terminal T25 is at the "L" level or not. If the analog-to-digital convertion end signal is at the "H" level, it means that the analog-to-digital convertion is completed. If it is at the "L" level, the analog-to-digital convertion is started. Accordingly, the microcomputer waits till the analog-to-digital convertion starts, and then it determines in the step SP32 whether a request for interruption processing is inputted from the motor drive circuit or not. If the request for interruption processing is inputted from the motor drive circuit, the microcomputer 30 sets, in the step SP33, the transfer clock pulse stop signal of the terminal T23 at the "H" level and performs motor drive processing in the step SP34. Subsequently, in the step SP35, the microcomputer 30 sets the transfer clock pulse stop signal at the "L" level to start again the transfer.

If the motor drive processing is completed or if it is determined in the step SP32 that a request for interruption is not inputted from the motor drive circuit, the microcomputer 30 waits in the step SP36 till the analog-to-digital convertion end signal attains the "H" level. Then, in the step SP37, the number n of data is decremented by 1 and it is determined in the step SP38 whether the number n of data is 0 or not. If it is not 0, the microcomputer 30 receives the subsequent data and performs analog-to-digital convertion. Thus, the procedures in the steps SP31 to SP37 are repeated until the number n of data becomes 0.

When the number n of data becomes 0, the microcomputer 30 sets, in the step SP39, the number n of peak-hold data and sets the signal of the terminal T16 at the "H" level so that the peak-hold circuit 24 performs peak holding and sampling operation. Then, operations in the steps SP40 to SP47 are executed so that peak holding and sampling operation for the dark output component is performed by the set number n of data. Since the operations in the steps SP40 to SP47 are the same as in the above described steps SP31 to SP38, a detailed description thereof is omitted.

In the step SP48, the microcomputer 30 sets the number n of the subsequently received data and sets the signal of the terminal T16 at the "L" level so that the sampling state in the peak-hold circuit 24 is changed to the holding state. Then, the operations in the steps SP49 to SP57 are repeated so that the data input mode of the number n of picture elements required for data processing is executed. The operations in the steps SP49 to SP54 are the same as those in the steps SP31 to SP36. When the microcomputer 30 executes the operation in the step SP54, it stores in memory the data inputted in the step SP55. Then, the operations in the steps SP56 and SP57 are executed and the program returns to the data processing routine.

In the data processing routine, data processing is performed in the step SP8 shown in FIG. 7 and it is determined in the step SP9 whether an in-focus condition is obtained or not. If the in-focus condition is obtained, the microcomputer 30 stops, in the step SP13, the drive of the motor by the motor drive circuit and displays, in the step SP14, the in-focus condition. If the in-focus condition is not obtained, amount of defocus is evaluated based on data inputted from the photoelectric converting portion 1 and a value N as a motor drive amount dependent on the defocus amount is set in the counter. Then, in the step SP11, it is determined whether the motor is being driven or not. If the motor is not being driven, the motor drive circuit drives the motor.

The present invention is also applicable to a case for starting integration of photoelectric current during a period when an image signal is transmitted from the CCD shift register SR. More specifically, in this case, a shift pulse generation permitting signal supplied to the terminal T19 is caused to be at the "L" level and an integration start or clear signal is supplied to the terminal T17 so as to forbid generation of a shift pulse. The integration start signal changes the output of the flip-flop FF0 to the "H" level and renders ineffective a transfer stop signal supplied to the terminal T22 through the inverter IN3. However, the shift pulse generation permitting signal of the "L" level at the terminal T19 causes the AND circuit AN8 to be opened through the inverter IN4 and the OR circuit OR4 so that the transfer stop signal of the terminal T23 is rendered effective. Therefore, in this case, interruption processing is applied effectively since the transfer clock stop signal is rendered effective even when the photoelectric converting portion 1 is operating.

Figure 9:
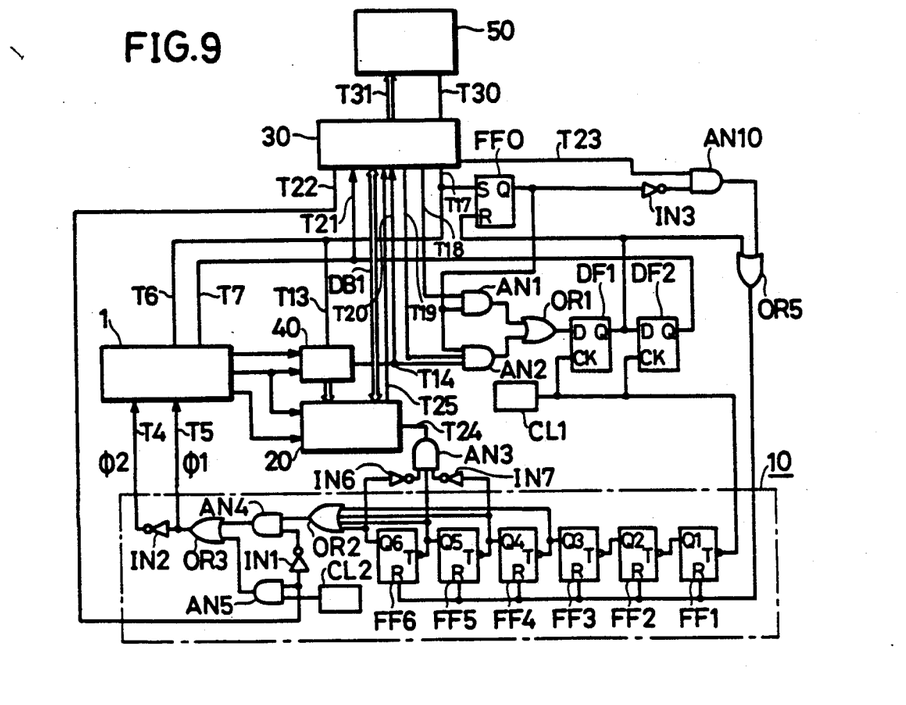
FIG. 9 is an electric circuit diagram showing another embodiment of the present invention.

FIG. 9 is an electric circuit diagram showing another embodiment of the present invention. The embodiment shown in FIG. 9 is a modification of the electric circuit shown in FIG. 2. In the circuit shown in FIG. 2, when the transfer stop signal at the terminal T23 is outputted, the transfer clock pulses are stopped in that state, while in the example shown in FIG. 9, the transfer stop signal is supplied to the reset input terminals of the T flip-flops FF1 to FF6 through an AND circuit AN10 and an OR circuit OR5 to reset them whereby the reset state of the transfer clock generator 10 is maintained. Consequently, the timing for causing the transfer stop signal to attain the "H" level is limited in a period after the end of the analog-to-digital convertion until the transfer clock pulse $\phi1$ rising to the "H" level falls to the "L" level. The other operation is the same as in the case of FIG. 2.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A solid state image sensor drive apparatus comprising:
   a plurality of light receiving elements for receiving light impinged thereon and outputting electric charges,
   electric charge accumulating means for accumulating the electric charge outputted from each of said light receiving elements,
   accumulation time control means for controlling the accumulation time of the electric charges in said electric charge accumulating means and generating a stop signal designating the stop of the accumulation,
   serial output means for storing the electric charges accumulated in said electric charge accumulating means and outputting serially the stored electric charges,
   transfer means for transferring, in parallel, the electric charges accumulated in said electric charge accumulating means to said serial output means in response to the stop signal from said accumulation time control means,
   data reading means for reading data stored in said serial output means,
   transfer signal generating means for generating a transfer signal for successively transferring to said data reading means the electric charges stored in said serial output means, and
   control means for interrupting and restarting the transmission of the transfer signal from said transfer signal generating means during a period when said data reading means successively reads the electric charges stored in said serial output means based on the transfer signal.

2. A solid state image sensor drive apparatus as claimed in claim 1, wherein the serial output means comprises an analog shift register.

3. A solid state image sensor drive apparatus comprising:
   a plurality of light receiving elements for receiving light impinged thereon and outputting electric charges,
   electric charge accumulating means for accumulating the electric charge outputted from each of said light receiving elements,
   accumulation time control means for simultaneously controlling the accumulation time of the electric charges in said electric charge accumulating means and generating a stop signal designating the stop of the accumulation,
   serial output means for reading and storing the electric charges accumulated in said electric charge accumulating means and outputting serially the stored electric charges,
   read signal generating means for generating a read signal for successively performing the reading operation of said serial output means, and
   control means for interrupting and restarting the transmission of the read signal from said read signal generating means during a period when said serial output means successively reads the electric charges accumulated in said electric charge accumulating means.

* * * * *